(12) United States Patent
Lu (10) Patent No.: US 11,413,551 B2
(45) Date of Patent: Aug. 16, 2022

(54) APPARATUS FOR SIMULATING FLYING MOTION

(71) Applicant: Dongxiu Lu, Eastvale, CA (US)

(72) Inventor: Dongxiu Lu, Eastvale, CA (US)

(*) Notice: Subject to any disclaimer, the term of this patent is extended or adjusted under 35 U.S.C. 154(b) by 103 days.

(21) Appl. No.: 17/271,459

(22) PCT Filed: Jun. 15, 2016

(86) PCT No.: PCT/US2016/037545
§ 371 (c)(1),
(2) Date: Feb. 25, 2021

(87) PCT Pub. No.: WO2016/205311
PCT Pub. Date: Dec. 22, 2016

(65) Prior Publication Data
US 2021/0346815 A1    Nov. 11, 2021

Related U.S. Application Data (60) Provisional application No. 62/182,296, filed on Jun. 19, 2015.

(51) Int. Cl.
*A63G 31/02*   (2006.01)
*A63B 69/18*   (2006.01)
*A63G 31/16*   (2006.01)

(52) U.S. Cl.
CPC .............. *A63G 31/02* (2013.01); *A63G 31/16* (2013.01)

(58) Field of Classification Search
CPC ........ A63G 21/00; A63G 21/20; A63G 21/22; A63G 31/02; A63B 69/18
USPC ................. 472/49, 77–80; 434/253
See application file for complete search history.

(56) References Cited

U.S. PATENT DOCUMENTS

2005/0019736 A1* 1/2005 Noll ........................ A63G 21/20
434/253
2013/0079169 A1* 3/2013 Dietz ....................... A63G 21/20
472/137

FOREIGN PATENT DOCUMENTS

DE    WO2006119979 A1 *  5/2006

* cited by examiner

*Primary Examiner* — Kien T Nguyen
(74) *Attorney, Agent, or Firm* — Che-Yang Chen; Law Office of Michael Chen (57) ABSTRACT

In one aspect, a system for people to simulate flying motion may include a plurality of supporting posts, one or more control units, and each of the control unit is connected to the user's body through a string, and a sensor is disposed on each string. The sensor can detect the tension change of the string and transmit the signal to the control unit to adjust the tension accordingly. When the user moves the wings, the change of the tension can be detected by the sensor and transmitted to the control unit to further adjust the tension of each string by pulling or releasing the strings to enable the user to enjoy the flying motion.

11 Claims, 6 Drawing Sheets

APPARATUS FOR SIMULATING FLYING MOTION

FIELD OF THE INVENTION

The present invention relates to a flying apparatus for sporting activities, and more particularly to a flying apparatus with which a person can simulate a flying motion with a pair of wings.

BACKGROUND OF THE INVENTION

In nature, many creatures are able to move through the air easily, gracefully and swiftly. Man has always dreamed of equaling this natural motion through the atmosphere, but to date has been essentially unable to do so. Birds, insects and even mammals are able to fly with flapping wings.

Various human body attached wing devices are known in the prior art. Earlier devices were designed primarily as flying devices, generated enough lift forces for flight rather than just enough to reduce a user's effective weight. Only later were devices designed specifically for sporting activities such as ice-skating, roller-skating, or downhill alpine activities such as skiing and snowboarding.

The present invention does not actually provide a flying device for people to fly in the sky. Instead, the present invention provides a system for people to simulate the flying motion with a pair of wings.

SUMMARY OF THE INVENTION

It is an object of the present invention to provide a system for people to simulate the flying motion with a pair of wings.

It is another object of the present invention to provide a system with a balance to monitor a person's weight, so when one side of the balance is slightly lighter than the person's weight, the person can flap the wings to simulate the flying motion to offset the weight difference.

It is a further object of the present invention to provide a system with an electronic sensor to control and balance a person's weight, so the person can flap the wings to simulate the flying motion to overcome the weight difference provided by the system.

It is another object of the present invention to provide a system for people to simulate the flying motion and the system can be provided in amusement parks, gyms, etc.

In one aspect, a system for people to simulate flying motion may include a T-shaped supporting unit, which may include a supporting post and a balance beam disposed on the supporting post. A connecting string is disposed on each end of the balance beam, wherein one of the connecting strings is coupled with one or more pieces of counterweight, while the other connecting string is coupled with a human body with imitation wings. A driving motor on the supporting post where the balance beam is disposed.

Before using the system, the counterweight at one end of the balance beam has to match the user's weight with the imitation wings, and dispose the counterweight and the user to both ends of the balance beam. At this time, both sides of the balance beam should be balanced. In one embodiment, when a predetermined weight, for example 1 to 5 kg is removed from the counterweight, the balance beam will lean to the user's side. When the user starts to simulate the flying motion with the imitation wings, a lift force can be generated to offset or even overcome the weight differences on both sides of the balance beam, so the balance beam may lean to the side of the counterweight while the user can feel the body move up. When the user stops the flying motion, there is no more lift force to offset or overcome the weight differences on both sides of the balance beam, so the balance beam will again lean to the user's side while the user can feel the body go down. Therefore, with the repetition of the up and down movement, the user can feel the flying motion with the wings on the body, namely the one-dimensional flying motion.

In another aspect, a system for people to simulate flying motion may include a supporting frame similar to a soccer goal, a control unit, a sensor, and a string. In one embodiment, the control unit is disposed on a horizontal beam of the supporting frame, and the control unit is used for control the tension of the string and can be a step motor controlled by a CPU. One end of the string is connected to the user with a pair of imitation wings, and the other end there of is connected to the control unit. The sensor is disposed on the string to detect the change of the tension on the string.

When in use, a lift force will be generated when the user moves the wings up and down, and the sensor can be triggered because the tension on the string changes accordingly. The sensor can further transmit a signal to the control unit regarding the tension change, so the control unit can adjust the tension of the string. The control unit may have a horizontal driving motor that can be used to drive the control unit to move horizontally on the horizontal beam of the supporting frame.

In a further aspect, a system for people to simulate flying motion may include a plurality of supporting posts, one or more control units, and each of the control unit is connected to the user's body through a string, and a sensor is disposed on each string. As discussed above, the sensor can detect the tension change of the string and transmit the signal to the control unit to adjust the tension accordingly.

In one embodiment, a step motor that can be controlled by a CPU is used in the control unit to control the pull-up/release of the string. When the user remains still with three strings connected to his/her body, different tensions may be applied to three strings, which can be recorded in the CPU. As discussed in the previous aspect, in the triangle area defined by the three supporting posts, a plurality of virtual grids can be formed in the triangle area, and the tension of each string at each grid point can be calculated and recorded in the CPU. When the user moves the wings, the change of the tension can be detected by the sensor and transmitted to the CPU in the control unit to further adjust the tension of each string by pulling or releasing the strings to enable the user to enjoy the flying motion. It is noted that in this aspect, the user can move the wings to simulate the flying motion in three dimensions (up-down; forward-backward; left-right), so it can be considered a three-dimensional flying motion.

In still a further aspect, a system for people to simulate flying motion may include a supporting unit that includes two parallel guiding rails, one or more control units, and each of the control unit is connected to the user's body through a string, and a sensor is disposed on each string. Each control unit has a horizontal driving motor to enable the control unit to move along the guiding rail.

When in use, the user is hung by the two strings between the guiding rails, and the horizontal driving motors drives the control units to move the user in a horizontal manner. When the user moves the wings, a lift force is generated but in this aspect, the lift force may not be vertical. Also, when the length of the strings is different, the lift force applied to the strings is different as well. As discussed above, the sensor can detect the change of the tension when the user moves the wings and transmit the signal to the control unit to adjust the tension of the strings by pulling or releasing the strings to enable the user to enjoy the flying motion. With the change of the angle and length of the string, the user can enjoy a flying motion in three dimensions when the user moves the wings. In another embodiment, the guiding rail can be partially or totally curved. In a further embodiment, the guiding rail can be disposed on the wall without using any supporting post.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As stated above, man has always dreamed of equaling this natural motion through the atmosphere, but to date has been essentially unable to do so. The present invention provides a system for people to simulate the flying motion with a pair of wings. The system can be provided at amusement parks, gyms, etc. for people to enjoy the flying motion and have fun.

Figure 1:
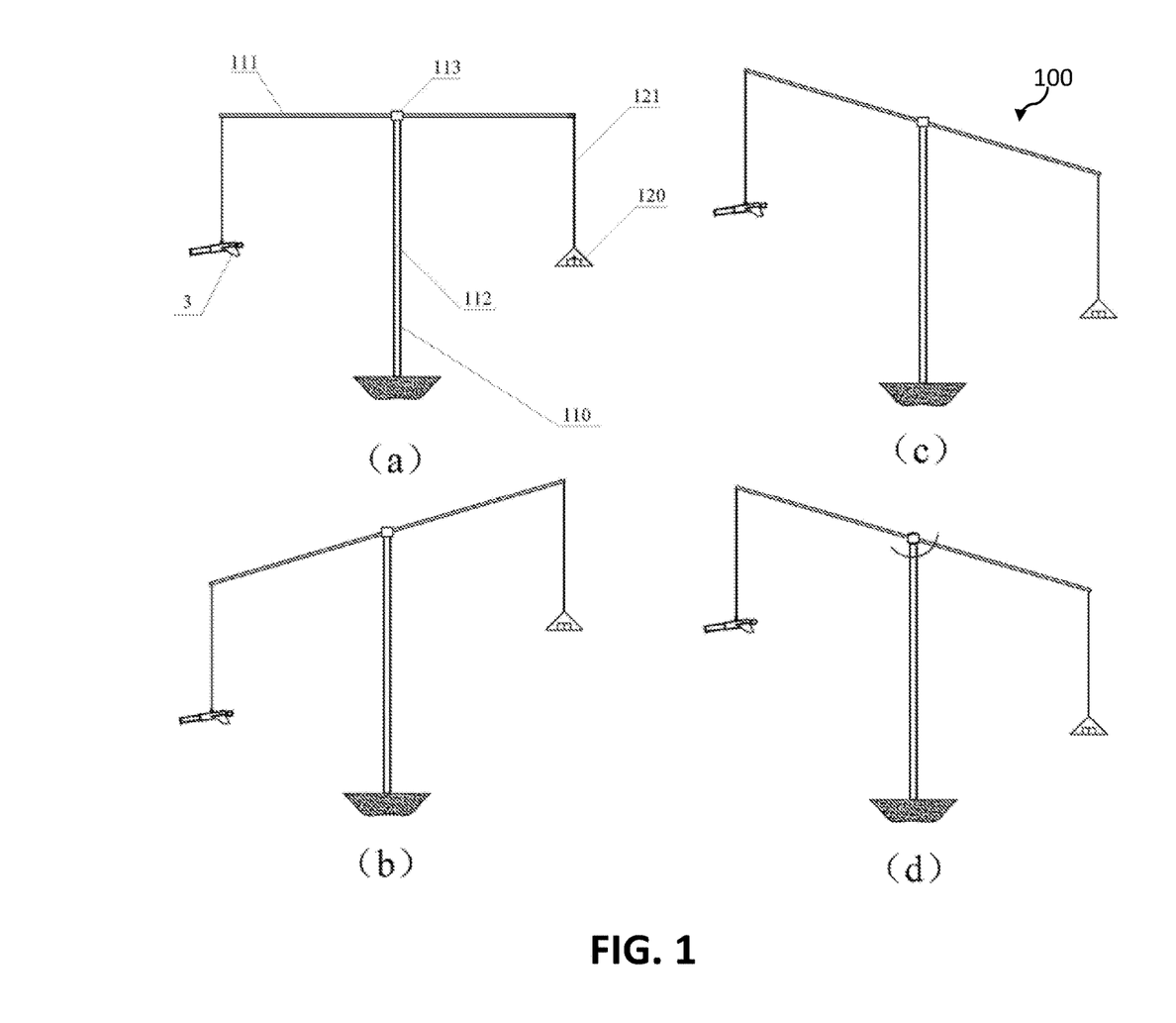
FIG. 1 illustrates a schematic view of a first aspect of the system for people to simulate flying motion in the present invention.

In one aspect, a system 100 for people to simulate flying motion may include a T-shaped supporting unit 110, which may include a supporting post 112 and a balance beam 111 disposed on the supporting post 112. A connecting string 121 is disposed on each end of the balance beam 111, wherein one of the connecting strings 121 is coupled with one or more pieces of counterweight 120, while the other connecting string 121 is coupled with a human body with imitation wings 3. A driving motor 113 on the supporting post 112 where the balance beam 111 is disposed.

Before using the system, the counterweight 120 at one end of the balance beam 111 has to match the user's weight with the imitation wings 3, and dispose the counterweight 120 and the user to both ends of the balance beam 111. At this time, both sides of the balance beam 111 should be balanced as shown in FIG. 1(a). In one embodiment, when a predetermined weight, for example 1 to 5 kg is removed from the counterweight 120, the balance beam 111 will lean to the user's side as shown in FIG. 1(b). When the user starts to simulate the flying motion with the imitation wings 3, a lift force can be generated to offset or even overcome the weight differences on both sides of the balance beam 111, so the balance beam 111 may lean to the side of the counterweight 120 as shown in FIG. 1(c) while the user can feel the body move up. When the user stops the flying motion, there is no more lift force to offset or overcome the weight differences on both sides of the balance beam 111, so the balance beam 111 will again lean to the user's side while the user can feel the body go down. Therefore, with the repetition of the up and down movement, the user can feel the flying motion with the wings on the body, namely the one-dimensional flying motion.

In one embodiment, when the driving motor 113 is turned on, the balance beam 111 can rotate around the supporting post 112, so the user can experience the up-and-down flying motion in a more realistic manner when the balance beam is rotating.

Figure 2:
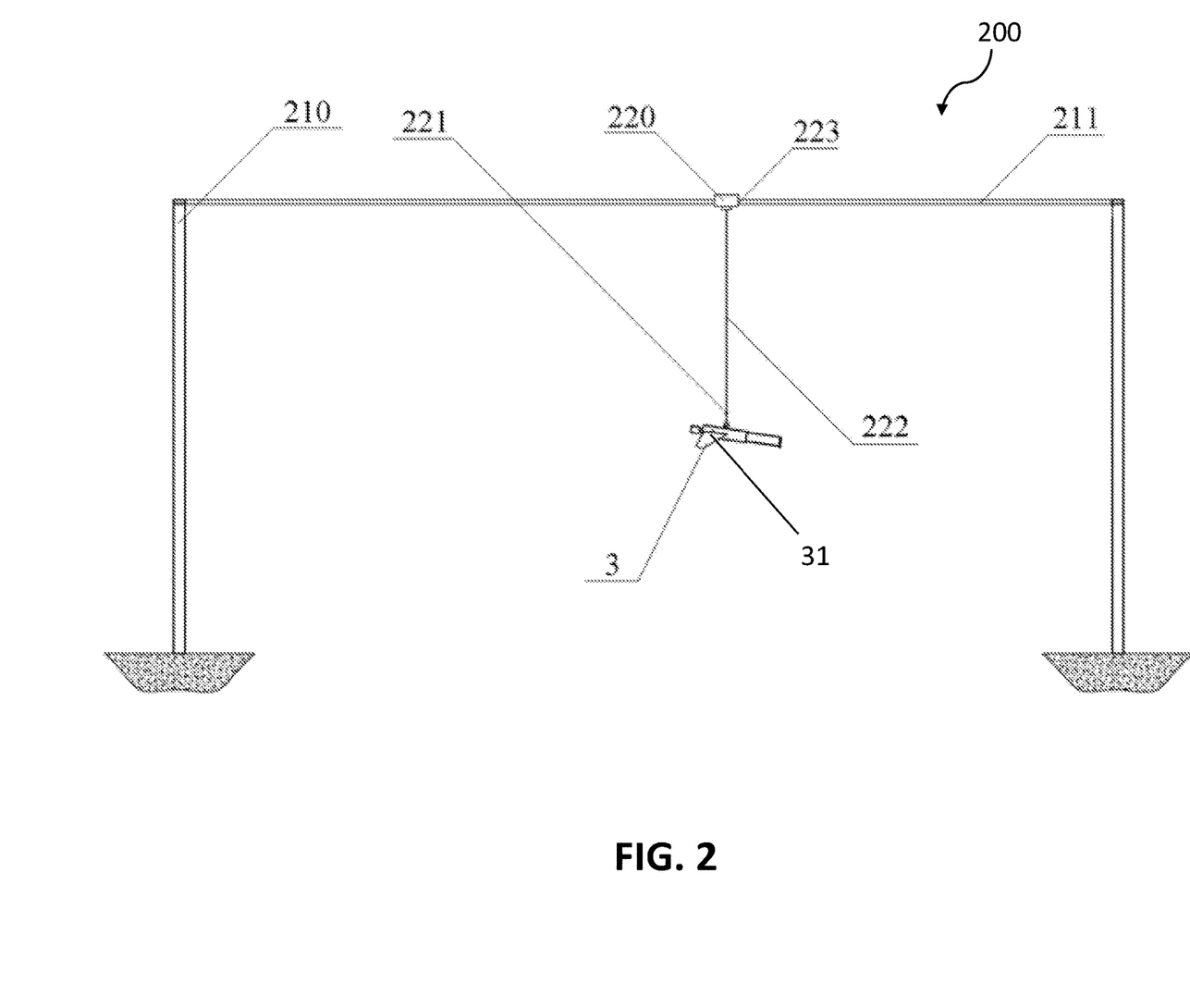
FIG. 2 illustrates a schematic view of a second aspect of the system for people to simulate flying motion in the present invention.

In another aspect, referring to FIG. 2, a system 200 for people to simulate flying motion may include a supporting frame 210 similar to a soccer goal, a control unit 220, a sensor 221, and a string 222. In one embodiment, the control unit 220 is disposed on a horizontal beam 211 of the supporting frame 210, and the control unit 220 is used for control the tension of the string 222 and can be a step motor controlled by a CPU. One end of the string 222 is connected to the user with a pair of imitation wings 3, and the other end there of is connected to the control unit 220. The sensor 221 is disposed on the string 222 to detect the change of the tension on the string 222. In another embodiment, a second sensor 31 may be disposed on the wings 3 to transmit signal of the frequency and speed of the vibration of the wings 3 to the control unit 220 to control the string 222. The second sensor 31 is especially useful when the user is a child who may not be strong enough to move the wings 3 to trigger the sensor 221.

When in use, a lift force will be generated when the user moves the wings up and down, and the sensor 221 can be triggered because the tension on the string 222 changes accordingly. The sensor 221 can further transmit a signal to the control unit 220 regarding the tension change, so the control unit 220 can adjust the tension of the string 222. The control unit 220 may have a horizontal driving motor 223 that can be used to drive the control unit 220 to move horizontally on the horizontal beam 211 of the supporting frame 210.

For example, if the user's weight is 60 kg, and when the sensor 221 detects that the user's weight becomes 59 kg, the control unit 220 can be stopped to adjust the tension of the string 222, and the user will be stay still. When the sensor 221 detects that the user's weight is more than 59 kg, the control unit 220 starts to release the string 222 and the user's body goes down. On the other hand, when the sensor 221 detects that the user's weight is less than 59 kg, the control unit 220 starts to pull up the string 222 and the user's body goes up. When the user stops moving the wings, the tension for the string 222 is 60 kg, which is more than 59 kg, the control unit 220 releases the string 222 so the user's body goes down. Therefore, the user's weight can be changed through his/her moving of the wings 3, and the weight change can trigger the control unit 220 to change the tension of the string 222, so the user can experience the flying motion by moving the wings 3. The user can experience a more realistic flying motion when the horizontal driving motor 223 drive the control unit 220 to move horizontally along the horizontal beam 211.

Figure 3:
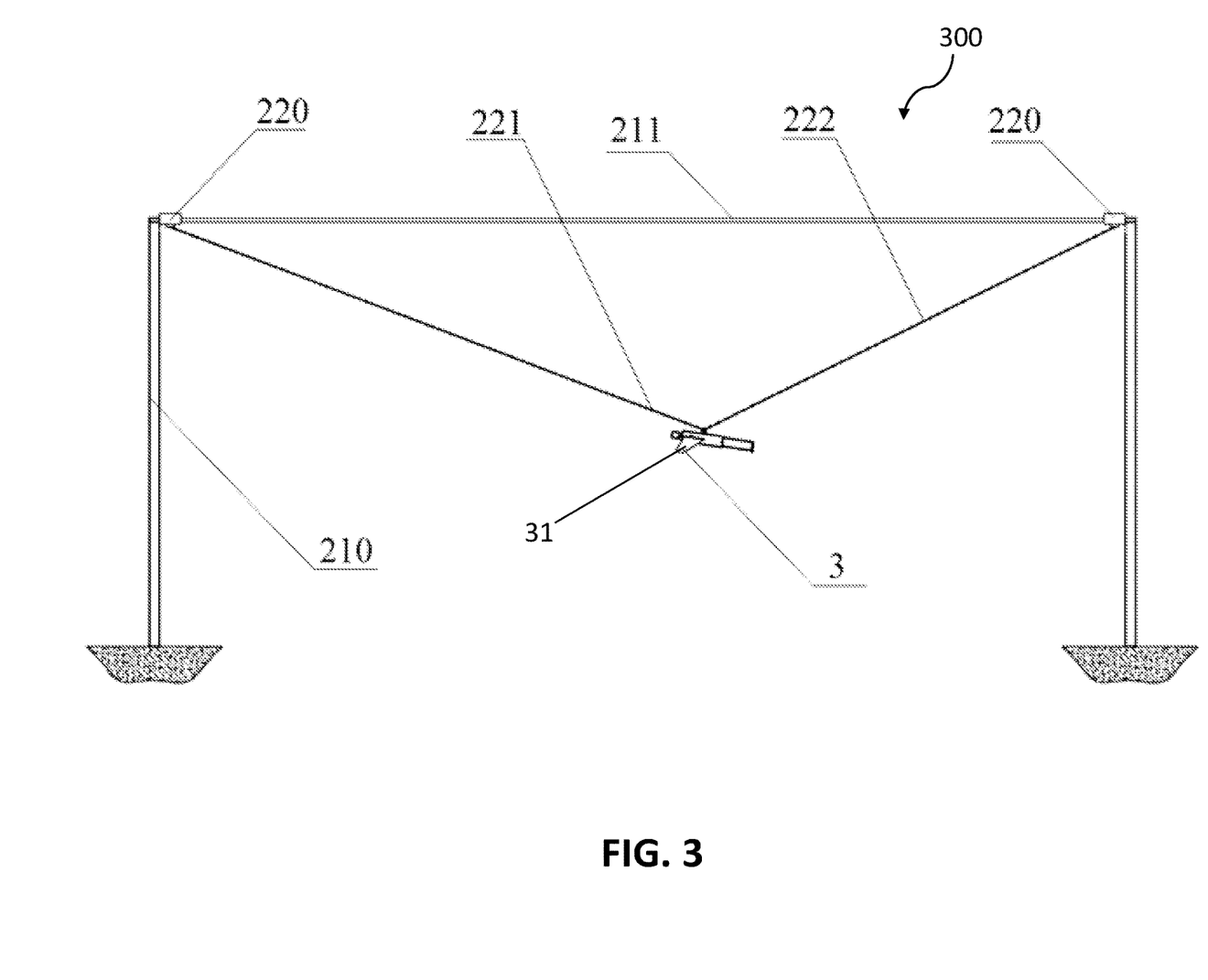
FIG. 3 illustrates a schematic view of a third aspect of the system for people to simulate flying motion in the present invention.

In still another aspect, referring to FIG. 3, a system 300 for people to simulate flying motion may include a supporting frame 210 similar to a soccer goal, one or more control units 220, a sensor 221, and one or more strings 222. In one embodiment, the control unit 220 is disposed at each of both ends of the horizontal beam 211 with two strings 222 to connect with the user's body, and each string 222 has a sensor 221. When in use, a lift force is generated when the user moving the wings 3 to trigger the sensor 221 as discussed above, the control units 220 will adjust the tension of the strings 222 accordingly. In one embodiment, a second sensor 31 may be disposed on the wings 3 to transmit signal of the frequency and speed of the vibration of the wings 3 to the control unit 220 to control the string 222. The second sensor 31 is especially useful when the user is a child who may not be strong enough to move the wings 3 to trigger the sensor 221.

When the user remains still, the tension of each of the strings 222 will transmitted to the control units 220 through the sensors 221, and the control units 220 are configured to memorize the values of the tension. A plurality of virtual grids can be formed within the flying area of the supporting frame 210, and the tension of the string 222 can be measured at every grid point. When the user moves the wings 3, a lift force will be generated but at this time, it may not be vertical. The sensor 221 can still detect the change of the tension and transmit the signal to the control unit to change the tension of the strings 222 accordingly. It is noted that in this aspect, the user can move the wings to simulate the flying motion in two dimensions (up-down; forward-backward), so it can be considered a two-dimensional flying motion.

Figure 4:
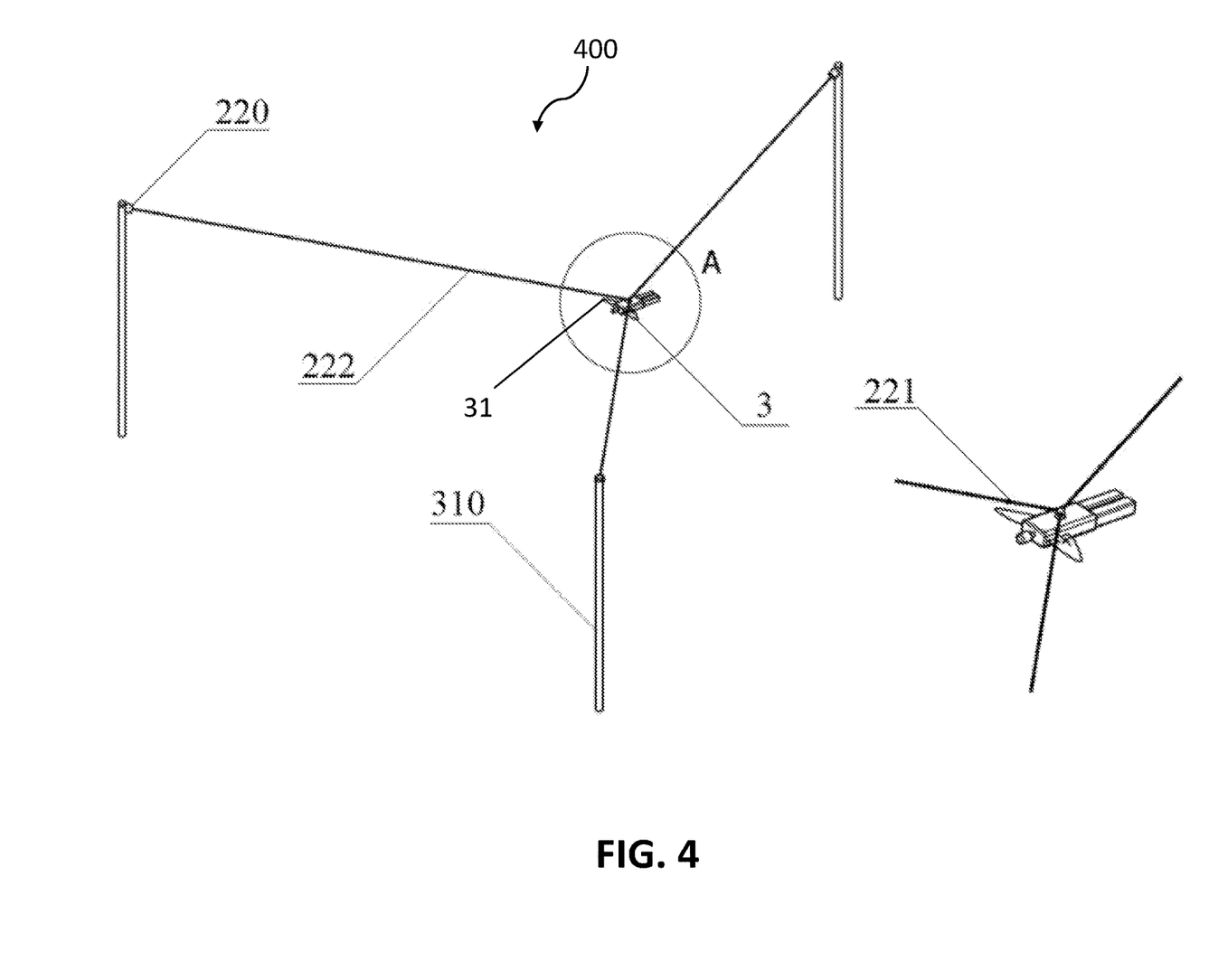
FIG. 4 illustrates a schematic view of a fourth aspect of the system for people to simulate flying motion in the present invention.

In a further aspect, referring to FIG. 4, a system 400 for people to simulate flying motion may include a plurality of supporting posts 310, one or more control units 220, and each of the control unit 220 is connected to the user's body through a string 222, and a sensor 221 is disposed on each string 222. As discussed above, the sensor 221 can detect the tension change of the string 222 and transmit the signal to the control unit 220 to adjust the tension accordingly.

In one embodiment, a step motor that can be controlled by a CPU is used in the control unit 220 to control the pull-up/release of the string 222. As shown in FIG. 4, when the user remains still with three strings 222 connected to his/her body, different tensions may be applied to three strings 222, which can be recorded in the CPU. As discussed in the previous aspect, in the triangle area defined by the three supporting posts 310, a plurality of virtual grids can be formed in the triangle area, and the tension of each string 222 at each grid point can be calculated and recorded in the CPU. When the user moves the wings 3, the change of the tension can be detected by the sensor 221 and transmitted to the CPU in the control unit 220 to further adjust the tension of each string 222 by pulling or releasing the strings 222 to enable the user to enjoy the flying motion. It is noted that in this aspect, the user can move the wings to simulate the flying motion in three dimensions (up-down; forward-backward; left-right), so it can be considered a three-dimensional flying motion.

Figure 5:
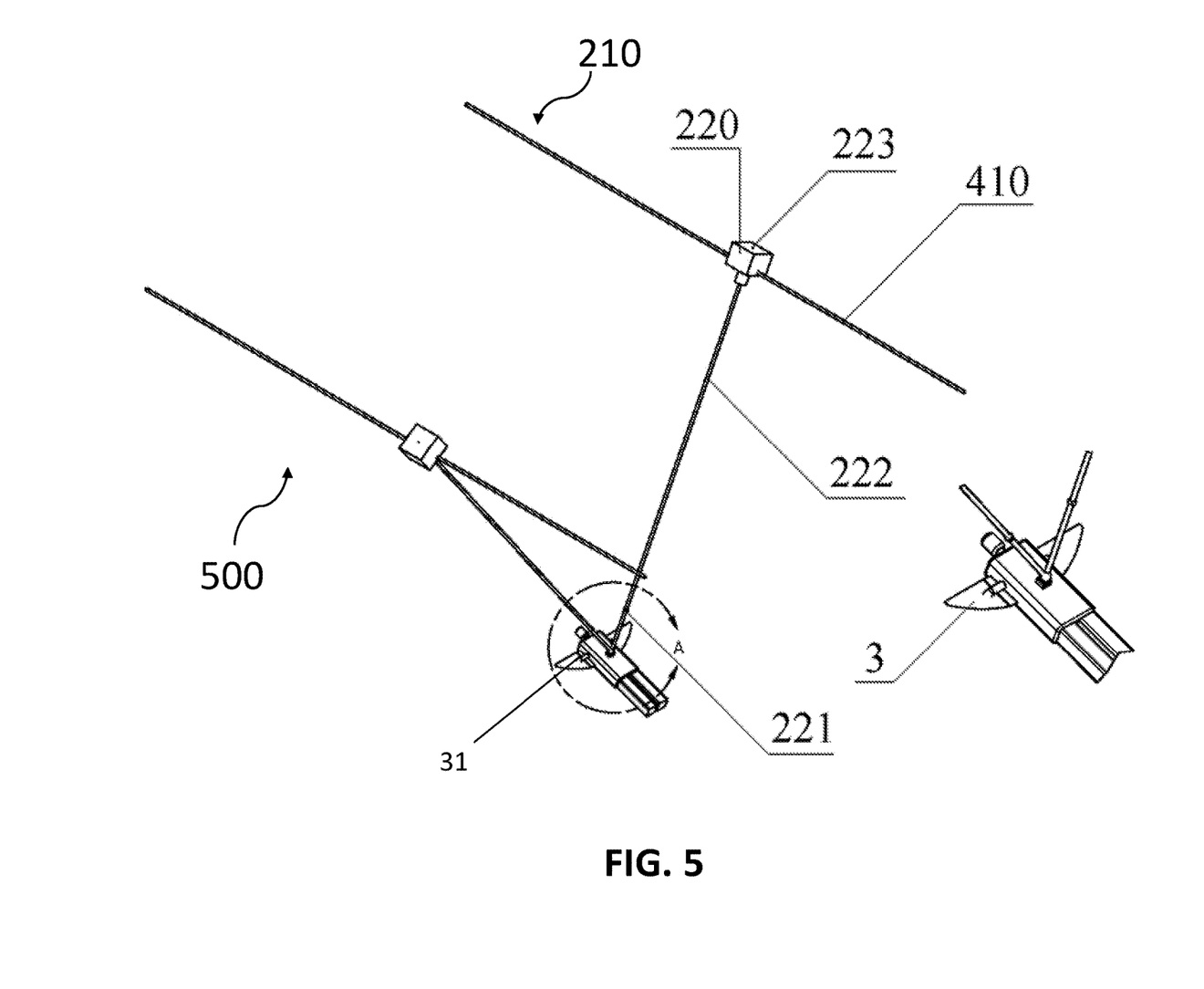
FIG. 5 illustrates a schematic view of a fifth aspect of the system for people to simulate flying motion in the present invention.

In still a further aspect, referring to FIG. 5, a system 500 for people to simulate flying motion may include a supporting unit 210 that includes two parallel guiding rails 410, one or more control units 220, and each of the control unit 220 is connected to the user's body through a string 222, and a sensor 221 is disposed on each string 222. Each control unit 220 has a horizontal driving motor 223 to enable the control unit 220 to move along the guiding rail 410.

Likewise, in another embodiment, a second sensor 31 may be disposed on the wings 3 to transmit signal of the frequency and speed of the vibration of the wings 3 to the control unit 220 to control the string 222. The second sensor 31 is especially useful when the user is a child who may not be strong enough to move the wings 3 to trigger the sensor 221.

When in use, the user is hung by the two strings 222 between the guiding rails 410, and the horizontal driving motors 223 drives the control units 220 to move the user in a horizontal manner. When the user moves the wings 3, a lift force is generated but in this aspect, the lift force may not be vertical. Also, when the length of the strings 222 is different, the lift force applied to the strings 222 is different as well. As discussed above, the sensor 221 can detect the change of the tension when the user moves the wings 3 and transmit the signal to the control unit 220 to adjust the tension of the strings 222 by pulling or releasing the strings 222 to enable the user to enjoy the flying motion. With the change of the angle and length of the string 222, the user can enjoy a flying motion in three dimensions when the user moves the wings. In another embodiment, the guiding rail 410 can be partially or totally curved. In a further embodiment, the guiding rail 410 can be disposed on the wall without using any supporting post.

In still a further embodiment, a second sensor 31 may be disposed on the wings 3 to transmit signal of the frequency and speed of the vibration of the wings 3 to the control unit 220 to control the string 222. The second sensor 31 is especially useful when the user is a child who may not be strong enough to move the wings 3 to trigger the sensor 221.

Figure 6:
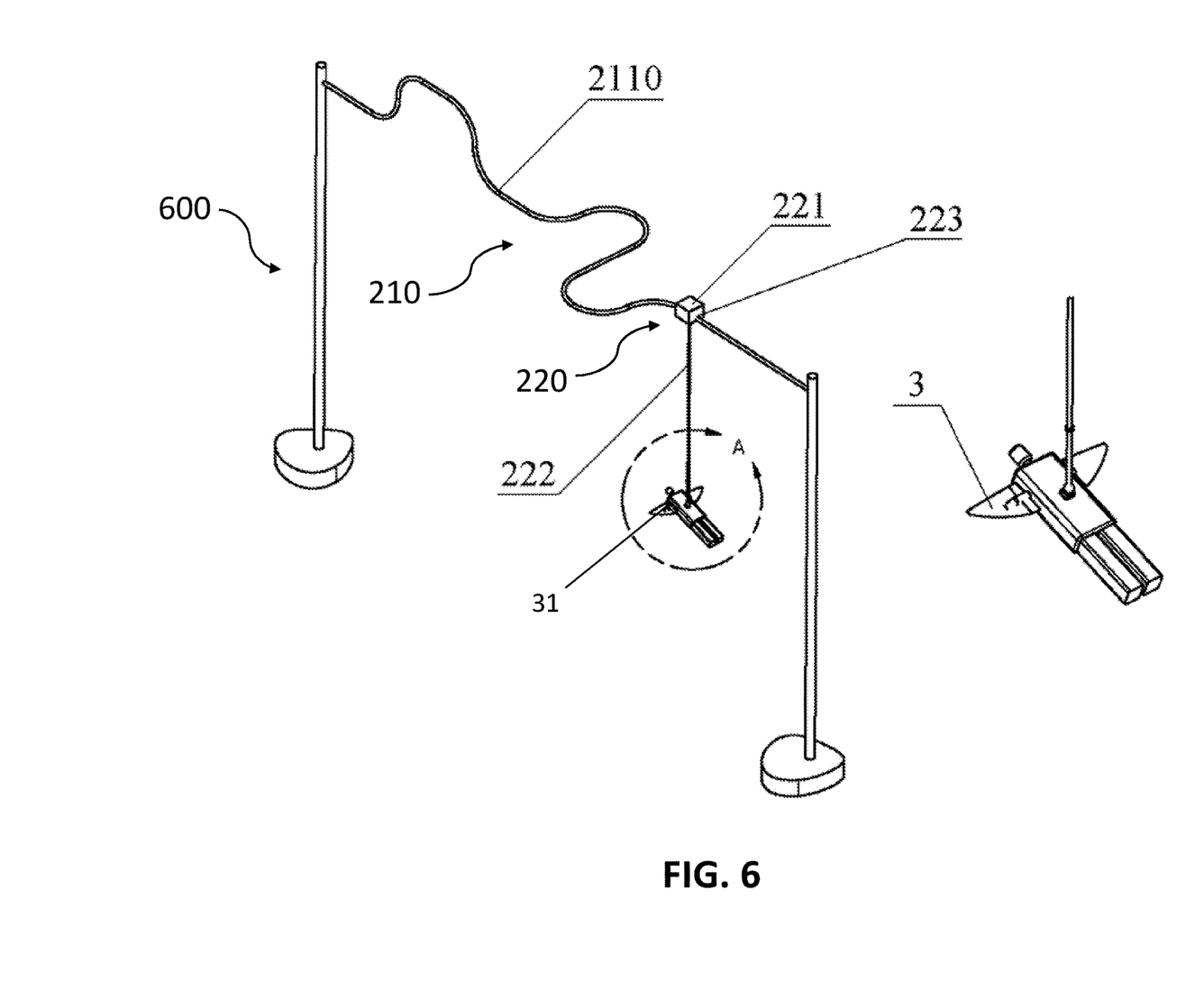
FIG. 6 illustrates a schematic view of a sixth aspect of the system for people to simulate flying motion in the present invention.

In still a further aspect, referring to FIG. 6, a system 600 for people to simulate flying motion may include a supporting frame 210, a control unit 220, a sensor 221, and a string 222. Unlike the aspect in FIG. 2, the control unit 220 is disposed on a curved rail 2110 of the supporting frame 210 instead of the horizontal bar. The user can experience the flying motion in three dimensions even with this one-dimensional setting. In one embodiment, the user can wear a goggle that is equipped with a display of virtual reality to simulate the environment while flying. In another embodiment, a display showing the sky, for example, can be disposed as a background, so the user can enjoy more about the flying motion.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. An apparatus for a person to simulate flying motion comprising:
   a supporting base;
   a pair of wings;
   one or more strings; one end of each string connected to the person and the other end thereof connected to a predetermined position of the supporting base; and
   a weight adjusting unit disposed at a predetermined position at the supporting base; said weight adjusting unit having a control unit to control a tension of the string;
   wherein a first sensor is disposed on a predetermined position of the string to detect a tension change thereof and when the person is hung with the wings and moves the wings in an up and down manner, a lift force is generated due to said wings movement and a first signal is generated and transmitted to the control unit for the tension change of the string;
   wherein a second sensor is disposed on the wings to transmit a second signal of a frequency and speed of the vibration of the wings to the control unit to adjust the tension of the string to enable the person to simulate a flying motion.

2. The apparatus for a person to simulate flying motion of claim 1, wherein the weight adjusting unit includes a plurality of counterweights.

3. The apparatus for a person to simulate flying motion of claim 1, wherein the supporting base is shaped as a soccer goal with a horizontal beam, and the control unit is disposed on the horizontal beam to control the tension of the string.

4. The apparatus for a person to simulate flying motion of claim 1, wherein the control unit includes a horizontal driving motor to drive the control unit to move along the horizontal beam to enable the person to experience a two-dimensional flying motion when moving the wings.

5. The apparatus for a person to simulate flying motion of claim 1, wherein the supporting base has a plurality of supporting posts, and the weight adjusting unit has a plurality of control units, and each control unit has a string connected to the user's body.

6. The apparatus for a person to simulate flying motion of claim 1, wherein the supporting base has three supporting posts to enable the person to experience a three-dimensional flying motion when moving the wings.

7. The apparatus for a person to simulate flying motion of claim 1, wherein the supporting base includes one or more parallel guiding rails.

8. The apparatus for a person to simulate flying motion of claim 7, wherein the guiding rail is at least partially curved.

9. The apparatus for a person to simulate flying motion of claim 7, wherein the guiding rail is disposed on the wall without any further supporting means.

10. The apparatus for a person to simulate flying motion of claim 1, wherein the supporting base has a curved rail, and the weight adjusting unit has a control unit disposed on the curved rail to control the tension of the string.

11. The apparatus for a person to simulate flying motion of claim 10, wherein the control unit moves along the curved rail to enable the person to experience a three-dimensional flying motion when moving the wings.

* * * * *